Aug. 7, 1945. S. L. DALTON 2,381,649
POWER SPRAYING MACHINE
Filed Nov. 27, 1943 3 Sheets-Sheet 1

Inventor
Samuel L. Dalton
By Wilfred E. Lawson
Attorney

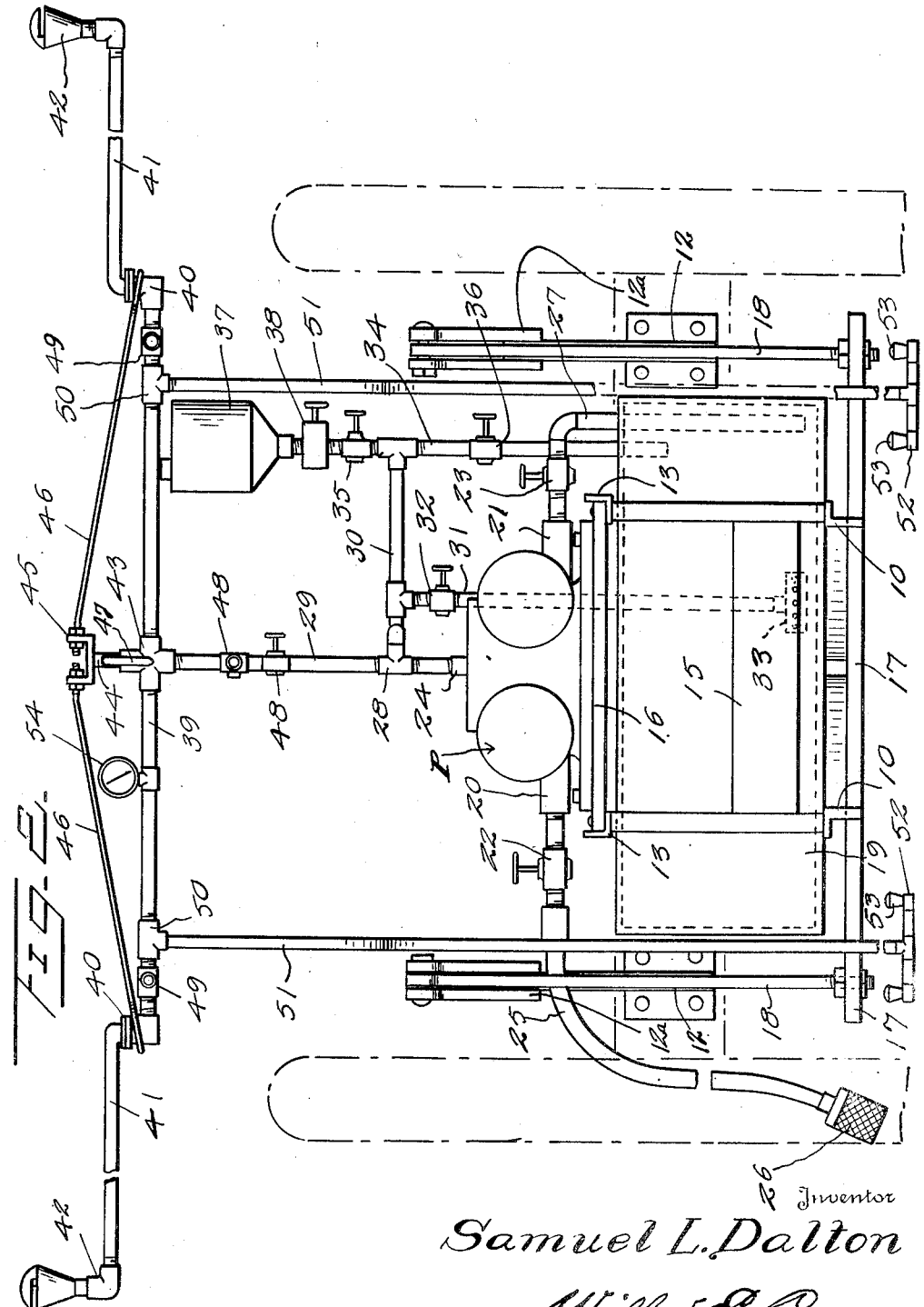

Aug. 7, 1945.  S. L. DALTON  2,381,649
POWER SPRAYING MACHINE
Filed Nov. 27, 1943   3 Sheets-Sheet 3
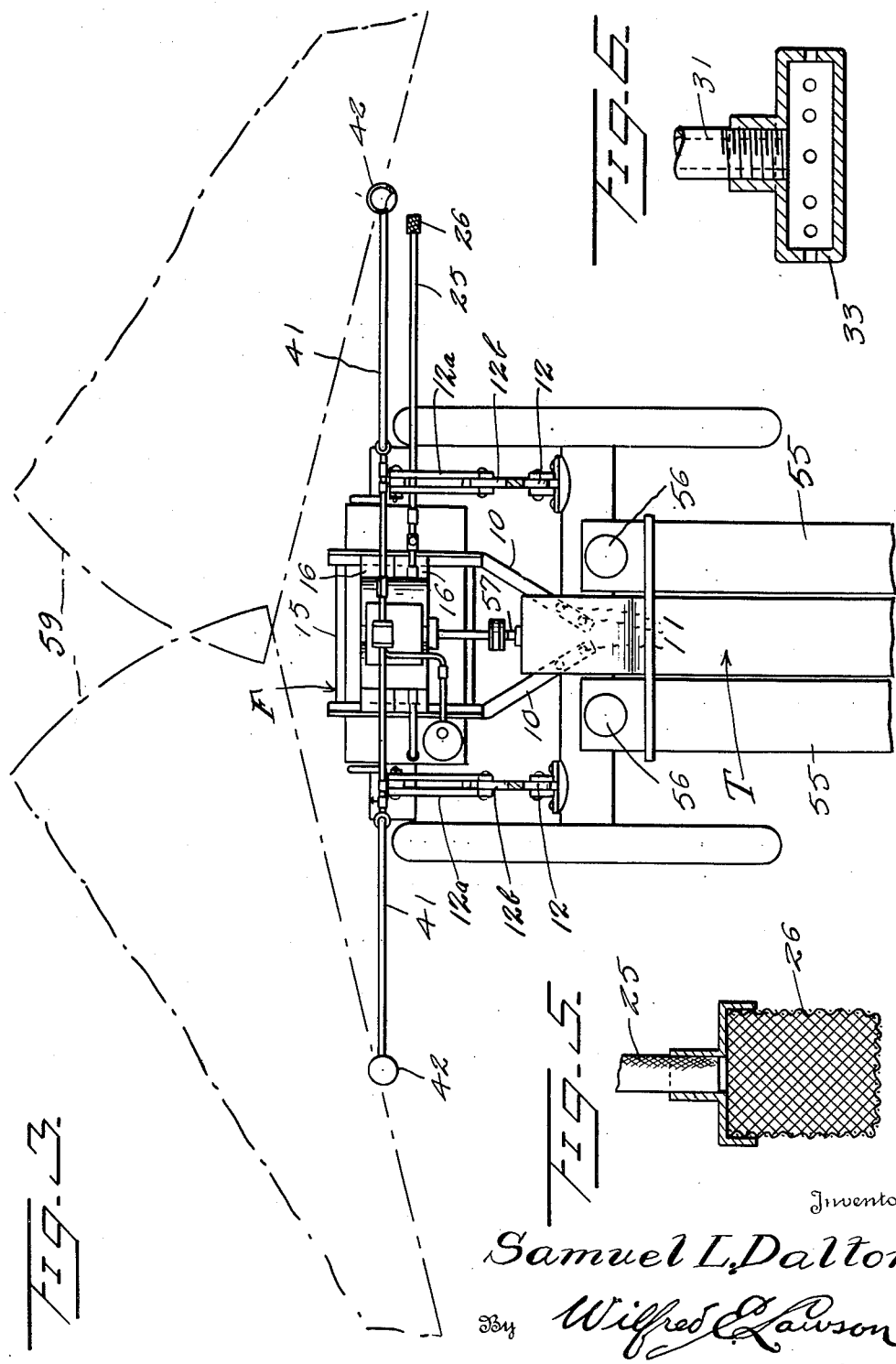
Inventor
Samuel L. Dalton
By Wilfred E. Lawson
Attorney Patented Aug. 7, 1945

2,381,649

UNITED STATES PATENT OFFICE 2,381,649

POWER SPRAYING MACHINE

Samuel L. Dalton, Ysleta, Tex.

Application November 27, 1943, Serial No. 512,018

4 Claims. (Cl. 299—42)

This invention has to do generally with pest control and is directed particularly to improvements in spraying machines by means of which a poison containing solution may be effectively distributed over the tops and underneath of growing plants.

A principal object of the present invention is to provide a spraying machine or apparatus which is constructed as a single or self contained unit adapted to be mounted upon any suitable type of carriage whereby it may be carried through fields of growing plants for distributing over the plants and against the undersides of the leaves and branches thereof a desired poison bearing solution, the machine being designed to take off operating power from any suitable adjacent source such, for example, as the power take off of a tractor upon which it may be mounted or by which it may be drawn along over the ground.

Another object of the invention is to provide a poison spraying machine employing a pressure pump, wherein parts are arranged in a novel manner so that the pump may be employed for taking on water and discharging the same into the solution tank and also for withdrawing the solution and forcing it through various spraying nozzles onto the plants.

Still another object of the invention is to provide in a spraying machine of the character stated, a novel arrangement of solution distributing pipes and spraying heads whereby the solution may be distributed over a wide area above the tops of the growing plants or it may be discharged upwardly from a low elevation, for distribution over the undersides of the plant leaves and stems.

Still another object of the invention is to provide a pressure spraying machine employing laterally extending spraying arms supported upon a raised structure, wherein such arms are swivelly mounted so that they may be swung inwardly toward the center of the machine to an inoperative position to facilitate movement of the machine along roadways or other places where adjacent trees or other structures might be struck by the spray arms if left in laterally extended position.

The invention will be best understood from a consideration of the following detailed description taken in connection with the accompanying drawings, with the understanding that minor changes may be made in the structure so long as such changes are within the scope of the appended claims.

In the drawings—

Figure 2 is a view in rear elevation.

Figure 3 is a top plan view on a reduced scale showing the spray pattern developed by the overhead spray nozzles.

Figure 5 is a detail illustrating the strainer for the intake pipe.

Figure 6 is a detail of the spray head within the tank.

Figure 1:
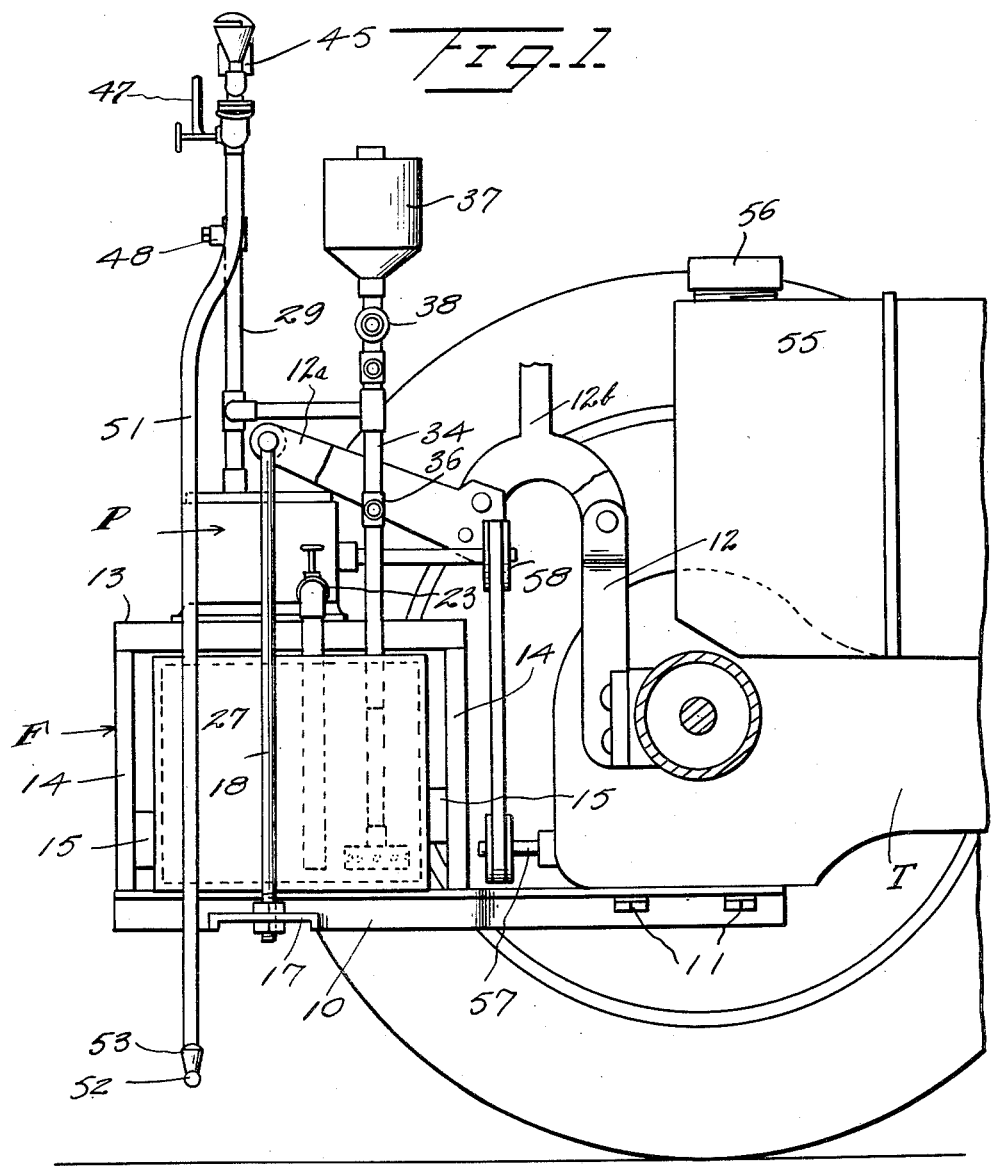
Figure 1 is a view in side elevation showing the present apparatus mounted on the rear of a tractor.
Figure 4:
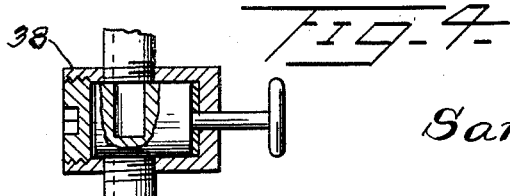
Figure 4 is a detail illustrating a type of measuring valve.

The power spraying mechanism of the present invention may be mounted upon any suitable structure by which its movement over the ground may be conveniently effected and while the mechanism has been herein illustrated and described as being supported in one particular way upon the back of a tractor it is to be understood that this is merely for the purpose of showing an operative set-up and is not to be considered as in any way limiting upon the manner of supporting the mechanism or of driving the pressure pump associated therewith.

In the drawings the reference character T generally designates a tractor upon which is shown apparatus for supporting the power spraying mechanism. In one type of tractor there is provided a hitch which is secured to the underside of the differential housing and this hitch is removed and is replaced by a pair of beams 10 which are secured to the differential housing by the bolts 11 which had previously secured the hitch mechanism in place.

This particular type of tractor also employs or has secured to the rear of the rear axle housing, plow lift means consisting of a vertical arm or bracket 12 secured on each side of the differential mechanism and a rearwardly extending supporting and lift arm 12a which is secured to the bracket 12 and adapted to be raised and lowered by a control lever 12b.

In accordance with a preferred embodiment of the present invention there is formed a rectangular tank enclosing frame F which includes the axle attached beams 10 as shown in Figure 1. This rectangular frame, in addition to the beams 10, comprises spaced parallel top rails 13, each of which is above and in parallel spaced relation with a beam 10, and these top rails are connected by the vertical post 14 with the underlying beams 10 as shown. At the front and rear of the tank frame the adjacent vertical posts 14 are connected by the transverse members 15 for imparting rigidity and strength to the tank enclosing and supporting structure.

Disposed across the top of the frame structure F between the horizontal rails 13 are planks 16 or other suitable means for forming a platform on which is mounted a pump P, of suitable design.

Tank frame F is connected with the plow lift arms 12a by a hanger comprising a bottom plate 17 which extends transversely of the underside of the frame and of the beams 10, and the suspension rods 18 by which the outer ends of the plate 17 are connected with the arms 12a.

By removing one of the hanger rods or suspension rods 18 a tank 19 may be introduced into the frame where, after the removed rod 18 is replaced, the tank will be securely retained.

As previously stated the pump P may be of any suitable design or form of construction such for example, as a gear pump and this is provided with the two intake or inlet pipes 20 and 21 which are controlled respectively by valves 22 and 23. While these pipes are here shown as entering the pump structure at different points, it will be well recognized that they may be joined to enter at a single admission point if desired.

The outlet or discharge for the pump is indicated at 24.

Connected with the intake pipe or arm 20 of the pump, is a flexible hose or tube 25 to the outer end of which is attached a suitable screen 26 which functions to prevent the entrance of undesirable material into the tank 19 when water is drawn from a stream or well or other source where there may be leaves or other particles which should not be introduced into the poison mixture containing tank. The other inlet arm 21 has a pipe 27 connected therewith, which extends down into the tank as shown.

Connected with the pump outlet 24 by a nipple 28, is a vertically extending discharge pipe 29 and a lateral pipe 30. In the pipe 30 is connected one end of a by-pass pipe 31 which is controlled by a valve 32. This by-pass pipe runs down into the tank and has upon its lower end, within the tank, an apertured head 33 from which by-passed fluid is discharged back into the tank to maintain the contents of the tank well agitated during the operation of the machine.

The lateral pipe 30 is also connected with the vertical poison introducing pipe 34 which runs down into the tank 19 as shown and which has the valves 35 and 36 therein, arranged respectively above and below the point of connection of the lateral pipe 30 with the pipe 34.

The upper end of the pipe 34 connects with a hopper or other suitable reservoir 37 in which the poison material is placed and below this hopper there is connected into the poison supply pipe 34, a suitable measuring valve 38 by means of which measured quantities of poison material may be extracted from the hopper 37 and allowed to pass downwardly into the tank through the pipe 34.

The discharge pipe 29 forms a supporting standard for the hereinafter described spraying arms. This pipe at its upper end is coupled to and discharges into the central portion of a transverse over-head distributor pipe 39 to each outer end of which is attached by a swivel coupling 40, a spray arm 41 which terminates at its outer end in the spraying nozzle or spray head 42 which is of a design to deliver a substantially semi-circular or fan-like spray pattern. The swivels 40 are arranged so that the arms 41 turn upon vertical axes and thus the arms can be swung horizontally to extend straight out from the longitudinal center of the machine or they may be swung rearwardly and inwardly toward the center of the machine into an inoperative position as hereinafter stated.

The connection between the vertical discharge pipe 29 and the distributing pipe 39 is preferably by means of a four way coupling 43, one arm of which is closed by a short vertical post 44, to the upper end of which a bracket head 45 is attached. From each side of this bracket head 45 there extends outwardly and downwardly a tie 46 which is attached at its outer end to the adjacent swivel coupling 40. By this means proper support is given to each outer end of the distributing pipe 39.

The post 44 has secured to the rear side thereof the hook 47 for connection with the spray arms 44 when they are swung inwardly to inoperative position.

The vertical discharge pipe 29 has a coupling 48 therein beneath the coupling 43 and there is a valve 48' in the pipe 29 below the coupling 48. There is also a valve 49 in the overhead pipe 39 adjacent each outer end thereof as shown.

Inwardly of each of the valves 49 is a coupling 50 to which is attached a depending spray arm 51, to the lower end of which is a transverse head 52, carrying at each of its outer ends a spray nozzle 53. The coupling 48 is provided for the connection with the pipe 29 of a third depending spray arm not shown, like the arms 51. The heads 52 are directed transversely to the longitudinal center or direction of movement of the machine and the nozzles are directed upwardly so that when the insecticide solution is discharged through these nozzles 53 it will be directed against the undersides of plant leaves and stems. When the solution is discharged through the corresponding, rearwardly directed nozzles 42 of the laterally directed arms 41 it will be deposited upon the tops of the plants since the arms are at a sufficient elevation to pass over the plants being treated whereas the hanging arms 51 are of such length as to dispose the transverse heads 52 and the nozzles 53 at the proper elevation to cause the insecticide solution to be projected upwardly upon the undersides of the plants and leaves.

The transverse distributing pipe 39 is provided with a suitable pressure gauge 54 so that the operator of the machine can see at a glance just what pressure is being maintained in the various pipes. This gauge may, of course, be placed at any other suitable location in the system.

In association with the apparatus thus described there may also be mounted upon the mechanism, such as the tractor structure, a pair of auxiliary tanks to carry water for transfer into the insecticide solution tank 19 when the latter tank needs replenishing. These auxiliary tanks are indicated by the reference character 55 and each is provided with a top opening 56 through which may be extended the end of the hose 25 after removing the strainer 26 therefrom.

As previously stated any suitable means may be employed for operating the pump P. When the machine is mounted at the rear of a tractor having a power take-off 57, the pump may be coupled by a suitable belt or other connection with the power take-off to transmit the necessary power to the pump through the medium of the pump pulley 58, or in any other manner.

As previously stated the spray nozzles 42 are preferably of the type to discharge a fan-like spray pattern covering a substantially semi-circular area. These may be turned on a vertical axis so that by properly setting the nozzles 42 the spray patterns may be made to slightly overlap at the longitudinal center of the machine so that a very wide area will be covered and at the same time the operator of the machine, who, if the power machine is a tractor, will be seated just ahead of the spray machine, will be protected from the spray.

Figure 3 illustrates diagrammatically how, by properly positioning the spray nozzles 42, the double spray pattern, which is indicated by the reference character 59, may be laid out so that a large area will be covered from one side of the machine to the other without endangering the operator of the tractor or other mechanism by means of which the spraying machine is moved. The nozzle openings produce an upwardly arching fan-like discharge which is laid on top of the plants.

In the operation of the spraying machine the tank 19 is first filled by opening the valves 22 and 36, closing valves 23, 35 and 48' and starting the pump to operating after placing the filter or strainer 26 in a suitable water reservoir.

Upon starting the pump to operating the water will be drawn in through the pipe 25 and the inlet 20 and passed out from the pump through the pipes 24, 30 and 34 into the tank 19. If desired, prior to the starting of this operation, the measuring valve may be turned to introduce a charge of poison into the upper end of the pipe 34, opening the valve 35 to allow the charge to pass through, after which the valve 35 will be shut. The water then being drawn in and discharged into the tank, will flush the poison through the pipe 34 into the tank as will be readily apparent. The valve 32 will be left open or partially open as set for operation of the machine so that some of the water being drawn from the supply and discharged into the tank, can be by-passed for introduction into the tank through the spray head 33 thereby providing an agitation which will thoroughly mix the poison with the water.

The valve 48' is used only when the pipes and sprays 51 and 52 are used, to cut off the spray system while the tank is being filled. When pipes 51 are not in use the valves 49 are used to cut off the sprays 42. By these means the spray can easily be confined to one side of the machine. This is very important where it is necessary to confine the spray to a certain area to avoid the danger of poisoning adjacent crops.

After the tank has been filled and the spraying operation is to commence, the valve 22 is closed and the valve 23 is opened. The valve 35 and the valve 36 are closed and the valves 48' and 49 are opened. The valve 32 after being set so as to produce the proper agitation in the tank is left as set during all phases of operation of the machine. If the first spraying operation is to apply the insecticide mixture to the undersides of plants by the use of the upwardly directed nozzles 53, then the valves 49 will be closed so as to prevent the material being discharged through the nozzles 42. However, if the spray is to be delivered from the overhead nozzles 42, the valves 49 are opened and the pipes or hanging spray arms 51 are removed and the couplings 48 and 50 closed by suitable plugs. Under normal conditions or for most of the time the spray arms 51 may be kept dismounted and the couplings 48 and 50 closed in the angle where the pipes 51 were attached since most of the spraying is from overhead and then when the undersides of the plants are to be treated the depending spray arms 51 can be attached as will be readily apparent, and the valves closed to effect the passage of the spraying solution through the nozzles 53.

If during the operation of the machine the tank 19 must be filled and no outside source of water is available then water may be drawn from an auxiliary tank 55 by introducing the end of the hose 25, after removing the screen, through a tank opening 56 to withdraw the contents of the tank.

Filling of the tanks may be easily accomplished by removing the nozzles 42, turning downwardly the elbow couplings by which the nozzles are connected to the pipes 41, and then swinging these pipes forwardly about the joint 40, to bring the elbows each into position over the filling opening 56 of an auxiliary tank. The pump may then be operated, after placing the end of hose 25 in a spring, well or other water supply source, to pump the water into the auxiliary tanks.

From the foregoing it will be readily apparent that there has been provided in the present machine, a compact easily operated apparatus by means of which high or low spraying operations may be readily and conveniently carried out with a minimum of labor. Also the operator is well protected as he does not handle, mix or transfer any of the poison beyond emptying original packages of the dry material into the hopper.

I claim:

1. A spraying machine comprising a fluid receptacle, a pump having an inlet connected with the receptacle to withdraw fluid therefrom, an outlet for the pump, a fluid discharge pipe connected with and extending upward from the outlet and forming a standard, spraying units connected with and supported by the discharge pipe standard, a take off pipe connected with said discharge pipe, a pipe connected with the take off pipe and leading into the receptacle, a hopper connected with the last mentioned pipe, and valves connected in the last mentioned pipe upon opposite sides of the connection therewith of the take off pipe.

2. A structure as set forth in claim 1, with a valved pipe connected with the take off pipe and leading into the receptacle to a point in close proximity to the bottom thereof by which fluid may be shunted off from the discharge pipe into the receptacle to agitate the contents of the receptacle.

3. In a spraying machine of the character stated, a rectangular frame unit having open sides, a hanger for said frame unit for mounting the unit upon a carrier, said hanger including suspension rods disposed upon the opposite open sides of the frame unit, a tank disposed within the frame unit and adapted to be removed and inserted through one of said open sides when the adjacent hanger rod is removed, means forming a platform upon the top of the unit, a pump mounted upon the platform, the pump having an intake connected with the tank for withdrawing fluid therefrom, an outlet for the pump, and spray units operatively connected with the outlet.

4. A spraying machine designed to be supported at the rear of a carrier structure such as a tractor, comprising a fluid receptacle, a pump having an inlet and an outlet, a connection between the inlet and the interior of the receptacle, a pipe connected with said outlet and extending vertically and forming both a fluid conducting means and a supporting standard, a four-way coupling having one arm connected with the upper end of said pipe and having two aligned arms extending horizontally, a distributor pipe connected with each of the horizontal arms of the coupling, a post connected in the fourth arm of said coupling and extending upwardly, truss rods connecting the upper end of said post with the outer ends of the distributor pipes, a spray arm pivotally attached to the outer end of each distributor pipe for swinging movement on a vertical axis, and a spray nozzle connected with the outer end of each spray arm and arranged to discharge a substantially semi-circular spray pattern in a horizontal plane, the nozzles being relatively arranged to substantially cover an area rearwardly of the distributor pipes extending from a point laterally of one nozzle to a point at a corresponding distance laterally of the other nozzle.

SAMUEL L. DALTON.